3,006,091
PRESS BED
Cyril Joseph Roos, Cedarburg, Wis., assignor to American Heat-Seal, Inc., Milwaukee, Wis.
Filed Oct. 12, 1959, Ser. No. 845,899
11 Claims. (Cl. 38—66)

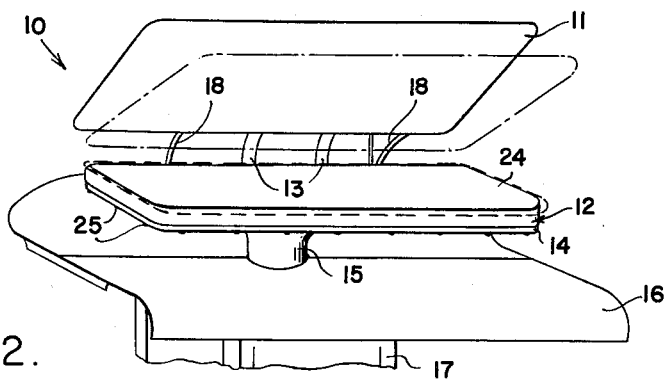
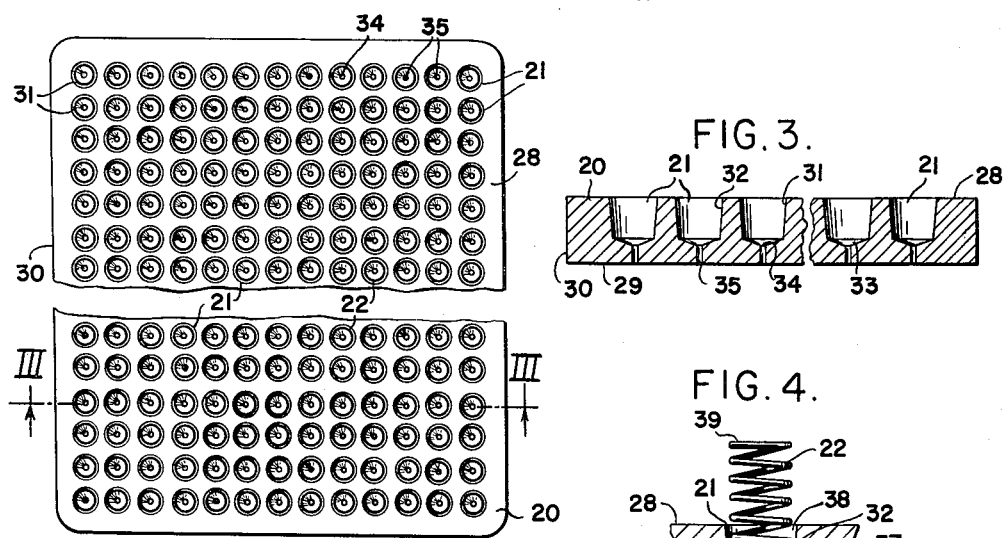
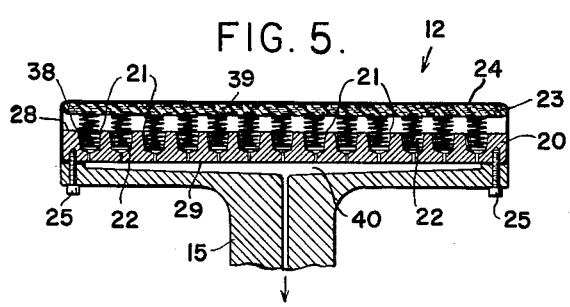
*INVENTOR.*
CYRIL J. ROOS
BY *Richard R Mybeck*
ATTORNEY United States Patent Office 3,006,091
Patented Oct. 31, 1961

This invention relates generally to pressing machines and more particularly to the manufacture of an improved press bed for use in pressing machines.

As used herein "pressing machines" defines those devices which, by the action of pressure and/or heat, provide means for ironing, laminating, heat sealing, mending and like operations which are generally performed upon fabrics, plastics and like materials.

In the manufacture of such machines according to prior art practices, it has been customary to utilize a built-up bed which relies upon a thick silicone-type elastomeric pad to provide pressing resilience whereby articles of varying thicknesses will receive substantially uniform pressing forces.

Such beds, when their silicone-type elastomeric pads are new, are found to possess excellent operational qualities. Unfortunately, however, these qualities are transitory since the beds, when subjected to the continual operation required of them, are frought with many disadvantages. For example, under the normal pressures and temperatures encountered in a pressing machine, the silicone-type pad readily deteriorates and loses its resilience with the result that it fails to effect the desired uniform pressing forces and has a service life of but about three months. In addition, the silicone-type pads require the use of an adhesive mounting which does not withstand cyclic applications of heat and pressure. These pads, as a consequence, readily slip and must frequently be realigned to assure a good working surface.

An earlier bed of the prior art employed compression springs held by a complex system of plates and caps as disclosed, for instance, in U.S. 1,054,407 to Hamilton. These beds, however, in addition to being both costly and complicated to fabricate, suffer serious disadvantages when mounted for operation upon pressing machines. For example, the springs themselves would buckle and become permanently distorted so that the bed only happhazardly provided even a resemblance of uniform reactivity. Furthermore, the caps would come off of one or more of the springs which in turn become dismounted so that caps and springs would roll free within the bed to foul other of the springs and again destroy the uniform reactivity of the bed.

The present invention is predicated upon my discovery that a substantially permanent press bed can be obtained which not only has all of the beneficial qualities of a bed utilizing a new silicone-type elastomeric pad, including substantially uniform reactivity, but which also maintains these properties throughout an extensive service life. These advantages are achieved by the coaction of a novel backing plate with a plurality of compression springs strategically arranged therewith and carried thereby in a unique manner which will be hereinafter more fully described.

Thus it becomes apparent that one of the prime objects of the present invention is to provide an improved press bed which realizes all the advantages of a bed employing a new silicone-type elastomeric pad without requiring the use of such pads and their attendant disadvantages.

Another important object of the present invention is to provide an improved press bed in which a uniform reactive pressure is obtained from a simple structure employing a series of strategically arranged compression springs without any of the disadvantages attendant the prior art use of such springs.

Still another object of the present invention is to provide an improved press bed which may readily be mounted upon the buck of a pressing machine to carry the cloth upon which fabric, plastic and like materials are placed without burning or scorching and which will not, under the action of pressure and/or heat, change either its dimensions or its reactive characteristics.

A still further object of the present invention is to provide an improved press bed in which a plurality of bisymmetrically disposed compression springs are mounted in special spring chambers which coact therewith to define an outwardly divergent annulus thereabout coaxial therewith which cooperate to hold the springs relative to the chambers to maintain spring recoil axial therewith and provide a substantially uniform reactive pressure therefrom regardless of irregularities occurring in the materials pressed thereupon.

Even a further object of the present invention is to provide an improved press bed having a unique backing plate having a plurality of tapered spring chambers bisymmetrically disposed therein and provided with special guide means for directing the flow of steam condensate therefrom.

These and still further objects as shall hereinafter appear are fulfilled by the present invention in a remarkably unexpected fashion as shall be discerned from the following detailed description of an illustrative embodiment thereof, especially when read in conjunction with the accompanying drawing, in which:

FIG. 1 is a fragmentary isometric view of a pressing machine of the type for which the present invention is especially suited;

FIG. 2 is a plan view, broken away for ease of illustration, of a backing plate and springs in accordance with the present invention;

FIG. 3 is a cross-sectional view of the backing plate, with the springs removed, taken along line III—III of FIG. 2;

FIG. 4 is an enlarged fragmentary section of a spring chamber and spring in accordance with the present invention; and FIG. 5 is a cross-sectional showing of a press bed embodying the present invention in the general plane of line III—III of FIG. 2.

Referring now to the drawing, in which like parts bear like numerals throughout the several views, the present invention will be described in connection with a pressing machine identified by the general reference numeral 10. It is of course understood that the present invention is not limited to the machine shown but rather is intended to be applicable to any machine which employs pressure and/or heat upon a resilient platen or bed.

As shown in FIG. 1, the pressing machine 10 consists of a pressing head 11 which is closeable upon a press bed 12 about suitable hinges 13. The action of head 11 closing upon the bed 12 is shown in phantom in FIG. 1.

Press bed 12 is suitably secured to a press buck 14 which is carried by a support 15 extending upwardly from a table 16 which, in turn, is carried by a base 17. The press head 11 is heated by a suitable heat source such, for example, as steam, electricity and the like which is fed to the head through suitable conduit 18.

The novel press bed of this invention, as shown in FIG. 5, comprises a backing plate 20 having a plurality of bisymmetrically disposed chambers 21, defined therein in a manner to be more fully described, each of which carries one of a plurality of springs 22. A dampening pad 23, formed of a suitable porous and heat resistant material such, for example, as fiberglass and the like, lays upon and is carried by the tops of the several springs 22.

A suitable cover (which, when steam is used as the heat source or damp articles are treated, should be porous, i.e., water permeable) such, for example, as fabric cover 24 envelops pad 23, springs 22 and plate 20 and is suitably fastened beneath plate 20 as with bolts 25 or laces, clips and like fastening means to define a self-contained unit.

It thus becomes apparent that press bed 12 comprises an assembly which is totally enclosed by the cooperative coaction of cover 24 and plate 20 and therefore is readily transported and easily interchanged with like beds of different dimensions to satisfy the exigencies of any job.

A significant feature of the present invention resides in the strategic definition of chambers 21 in back plate 20 and the manner in which springs 22 reside therein and coact therewith. This shall now be described.

Referring first to FIGS. 2 and 3, backing plate 20 is provided with an upper surface 28 (which usually is generally rectangular in shape) and a corresponding lower surface 29 joined by a peripheral edge 30 which imparts thickness thereto. While plate 20 is illustrated as being generally linear, it is of course understood that it may also be curved, either concave or convex, as the exigencies of a particular installation demand. Similarly, the plan contour of the plate may be oval, round or other desired shape.

A plurality of chambers 21 are defined in plate 20 having their mouths 31 in surface 28 and aligned both laterally and longitudinally with each other to define the bisymmetrical pattern shown in FIG. 2. Chambers 21 may be drilled or cast into plate 20 with substantially equal satisfactory results.

Each chamber 21, as shown especially in FIGS. 3 and 4, comprises a tapered inner wall 32 which converges into a generally conical bottom 33. Bottom 33, which, as shown, generally conforms to an inverted cone having an apex 34, is provided at the apex 34 with a passage 35 which establishes communication between chamber 21 and lower surface 29 of plate 20. The function of passage 35 will be hereinafter more fully described.

A plurality of springs 22, one of which is seated in each one of the chambers 21 as shown especially in FIG. 4, are formed generally helical from steel, tempered wire or other material capable of maintaining its spring under temperatures normally encountered in the foregoing operations, i.e., up to about 500° F. One inch tempered steel springs have, for example, given excellent results.

Each spring 22 is introduced through a mouth 31 of a chamber 21 and pressed down until its leading edge 36 firmly engages the inner wall 32 along a line 37 adjacent to but slightly spaced from bottom 33. When thus seated, wall 32 circumscribes the lower portion of spring 22 in an upwardly diverging fashion and coacts therewith to define an annulus 38 thereabout which gradually increases in thickness from line 37 to maximum thickness at mouth 31 of chamber 21. In this manner, chamber 21 not only guides spring 22 and resists any tendency the spring may have to buckle, it also accepts and supports the lateral expansion of the spring 21 resulting from the application of strong compressive forces thereto.

As shown especially in FIG. 4, each spring 22 extends outwardly from chamber 21 so that the upper ends coact to define a resilient quasi-surface 39 which is disposed in superposition to the upper surface 28 of the plate 20.

When assembled for use, as shown generally in FIG. 1 and in detail in FIG. 5, the novel press bed operates to fulfill all the aforestated objectives in a remarkably unexpected fashion.

Thus, when a damp article of varied thickness is laid upon the working surface of cover 24 and the press head 11 is turned about hinges 13 to engage the article between head 11 and bed 12, heat, supplied through conduit 18 in the form, for example, of steam, is transmitted from head 11 through the article to the bed 12. This heat will drive the moisture from the damp article into and through the cover 24, porous pad 23 and plate 20 where it will condense upon springs 22 and plate 20. The condensed moisture then collects in chambers 21 where, by the further action of inner wall 32 and bottom 33, it is directed to the apex 34 thereof.

The accumulation of moisture at the apex 34 of bottom 33 of chamber 21 is prevented, however, by the coaction of gravity with passage 35 which flows the condensate through plate 20 into a suitable drain 40.

The remarkable coaction of the several elements as described thus provides a press bed in which the base and spring bed are a single piece and in which the springs never leave their seat and yet are ever free to flex to provide a uniformly resilient reactivity to the pressing action of the machine.

It is, of course, understood that the foregoing illustration and description are presented merely to exemplify the present invention, not to limit it, and such modifications, alterations, and applications of the concepts herein presented as may readily occur to the skilled artisan confronted with this teaching are intended within the spirit of the present invention especially as it is defined by the claims appended hereto.

Accordingly, what I claim is:

1. A bed for pressing machines comprising: a base plate having a plurality of inwardly tapered spring chambers defined therein in a generally bisymmetrical pattern relative thereto; conduit means, one extending downwardly from each of said chambers and coacting therewith to establish unobstructed communication through said plate; a plurality of springs, each having a lower portion extending into one of said chambers in seating engagement therewith and each having an upper portion extending outwardly therefrom; a dampening pad carried by said upper portions of said springs; and water permeable cover means enveloping said pad, springs, chambers and plate to define a self-contained unit therewith.

2. A bed for pressing machines comprising: a base plate having upper and lower planar surfaces in generally spaced parallel relationship to each other; a plurality of spring chambers defined in said upper surface in a generally bisymmetrical pattern relative thereto and extending into said plate convergingly upon the axis of said chamber which is disposed generally normally of the plane of said upper planar surface, each of said chambers terminating in said plate in spaced adjacent relationship to said lower planar surface and having an inverted conical bottom portion having an apex coaxial with said chamber axis; conduit means disposed in said plate between said apex and said lower surface in unobstructed communicative relationship therewith; a plurality of generally cylindrical springs force fit one into each of said chambers to define an upwardly diverging annulus therewith and extending upwardly therefrom to define a supporting surface disposed in spaced relationship to said upper surface; a porous heat resistant pad overlaying and carried by said supporting surface; and permeable cover means coacting with said plate to envelop said springs, chambers and pad to define a self-contained unit therewith.

3. A bed for pressing machines comprising: a horizontal base plate having upper and lower surfaces; a plurality of generally vertical inwardly tapering spring chambers defined in said base plate in a generally bisymmetrical pattern relative thereto, each of said chambers having an inverted conical bottom portion coaxial therewith; a plurality of passages disposed in said plate substantially coaxial with said chambers, one each of said passages being in unobstructed communicative relationship between said lower surface and one of said bottom portions of said chambers; a plurality of compression springs held one in and by each one of said chambers and extending outwardly therefrom to define a supporting surface superposed to said upper surface; a dampening pad carried by said supporting surface; and water permeable cover means enveloping said pad, springs, chambers and plate to define a self-contained unit therewith.

4. A bed for pressing machines comprising: a base plate having a plurality of tapered spring chambers defined therein in generally bisymmetrical relationship thereto; a plurality of passages, one each being disposed in unobstructed communicative relationship with each of said chambers to drain said chambers; a plurality of springs seated one in each one of said chambers and extending outwardly therefrom into superposition with said plate; a dampening pad overlaying said springs; and porous cover means enveloping said pad, springs, chambers and plate to define a self-contained unit therewith.

5. A bed for pressing machines comprising: a base plate having upper and lower planar surfaces in generally spaced parallel relationship to each other; a plurality of spring chambers defined in said upper surface generally normal to the plane of said upper surface in a generally bisymmetrical pattern relative thereto and having an inner wall extending from said surface into said plate in converging relationship to the axis of said chamber, each of said chambers terminating in spaced proximity to said lower planar surface in an inverted conical bottom having an apex coaxial with said chamber; a plurality of passages disposed in said plate generally normal to said lower surface, one each being in unobstructed communicative registry with one of said apexes of said bottom portions; a plurality of spring means, one each being fit into and held by each one of said chambers and defining a coaxial divergent annulus therewith, each of said spring means extending outwardly therefrom to define a supporting surface disposed in spaced relationship to said upper surface; a heat resistant dampening pad coterminous with said spring means and carried by said supporting surface; and water permeable cover means carried by said pad enveloping said pad, springs, and plate to define a self-contained unit therewith.

6. A bed for pressing machines comprising: a base plate; a plurality of inwardly tapered chambers defined in said base plate in a generally bisymmetrical pattern relative thereto and establishing unobstructed communication therethrough, each of said chambers being tapered from a first width adjacent one end thereof to a smaller second width adjacent the other end thereof; a plurality of springs, having a width smaller than said first width and larger than said second width, telescopically mounted one in each one of said chambers for engagement thereby and extending outwardly therefrom; and cover means carried by said springs and enveloping said springs and plate to define a self-contained unit therewith.

7. A bed for pressing machines comprising: a base plate having upper and lower planar surfaces in spaced relationship to each other; a plurality of inwardly tapering chambers bisymmetrically disposed in said plate relative to said upper surface and extending into said plate into unobstructed communicative relationship with said lower surface; spring means mounted one in each of said chambers for engagement thereby and extending upwardly therefrom to define a resilient surface disposed in spaced relationship to said upper surface; and porous cover means carried by said resilient surface and coacting with said plate to envelop said springs and chambers to define a self-contained unit therewith.

8. A bed for pressing machines comprising: a base plate having upper and lower surfaces; a plurality of inwardly tapering chambers disposed in said base plate transversely of said upper surface and defining a generally bisymmetrical pattern relative thereto, each of said chambers having an inverted frustoconical upper portion and an inverted conical bottom portion coaxial therewith; a plurality of passages disposed in said plate substantially coaxial with said chambers, one each of said passages being in unobstructed communicative relationship between said lower surface and one of said bottom portions; a plurality of compression springs held one in each one of said chambers by the action of said upper portion thereupon and extending outwardly therefrom to define a resilient surface in superposition with said upper surface; and cover means carried by said resilient surface coacting with said plate to define a totally enclosed self-contained unit therewith.

9. A bed for pressing machines comprising: a base plate having a plurality of tapered chambers bisymmetrically disposed therein; drain means communicating with each of said chambers to drain said chambers; spring means seated in and held by each of said chambers and extending outwardly therefrom to define a resilient surface in superposition with said plate; pad means carried by said resilient surface; and porous cover means carried by said pad and coacting with said plate to define a self-contained unit therewith.

10. A bed for pressing machines comprising: a base plate having rectangular upper and lower planar surfaces in generally spaced parallel relationship to each other; a plurality of chambers defined in said upper surface coaxial with a line normal to the plane of said upper surface in a generally bisymmetrical pattern relative to said upper surface and having an inner wall extending from said upper surface into said plate in converging relationship to said line, each of said chambers further having an inverted conical bottom having an apex coaxial with said chamber and terminating in spaced relationship to said lower planar surface; conduit means operatively disposed in said lower planar surface and generally normal thereto and extending therefrom into unobstructed communicative relationship with said chambers, one means being substantially in registry with each of said apexes of said bottom portions; a plurality of spring means force fit one into each one of said chambers and defining a coaxial divergent annulus therewith, each of said spring means extending outwardly therefrom to define a generally rectangular resilient surface disposed in spaced relationship to said upper surface; a generally rectangular heat resistant dampening pad overlaying said resilient surface and carried thereby; and water permeable cover means carried by said pad and enveloping said pad, springs, and plate to define a self-contained unit therewith.

11. A backing plate for press beds comprising a plate having a plurality of chambers bisymmetrically defined therein having an inwardly tapered upper portion adapted to engage and hold a spring introduced therein and provide a diverging annulus thereabout and a lower portion for conducting condensate from said chamber through said plate.

References Cited in the file of this patent

UNITED STATES PATENTS

| | | |
|---|---|---|
| 1,054,407 | Hamilton | Feb. 25, 1913 |
| 1,900,720 | Lindemann | Mar. 7, 1933 |
| 1,900,748 | Wilhelm | Mar. 7, 1933 |
| 1,924,973 | Beede et al. | Aug. 29, 1933 |
| 2,199,157 | Hamilton | Apr. 30, 1940 |
| 2,264,158 | Clark | Nov. 25, 1941 |

FOREIGN PATENTS

| | | |
|---|---|---|
| 478,948 | Italy | Mar. 7, 1953 |